Jan. 28, 1941.  A. S. ANDERSON  2,229,628
CORN HARVESTER.
Filed May 8, 1939  3 Sheets-Sheet 1

A. S. Anderson
INVENTOR.
BY
ATTORNEYS.

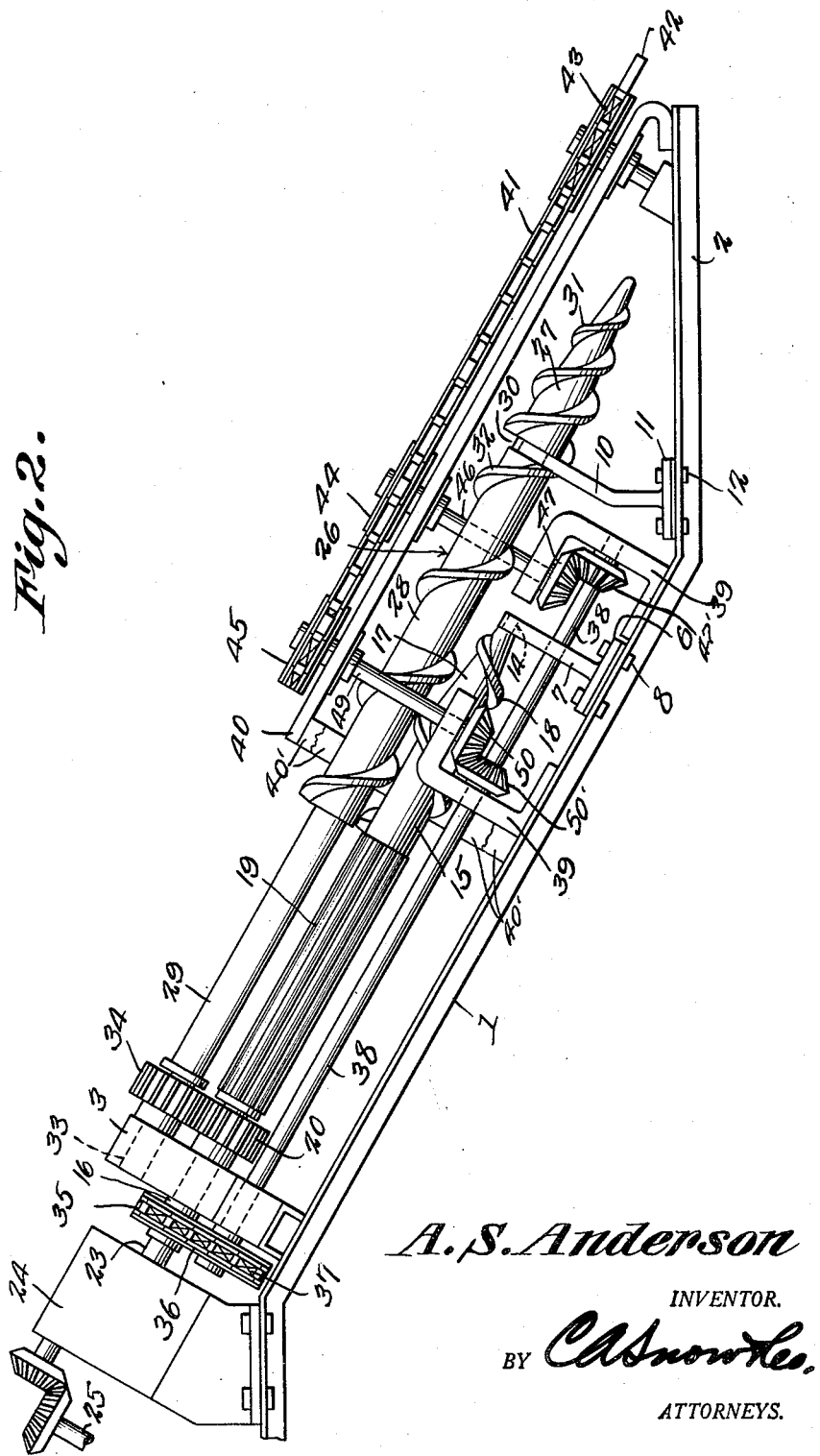

Jan. 28, 1941. A. S. ANDERSON 2,229,628
CORN HARVESTER
Filed May 8, 1939 3 Sheets-Sheet 3
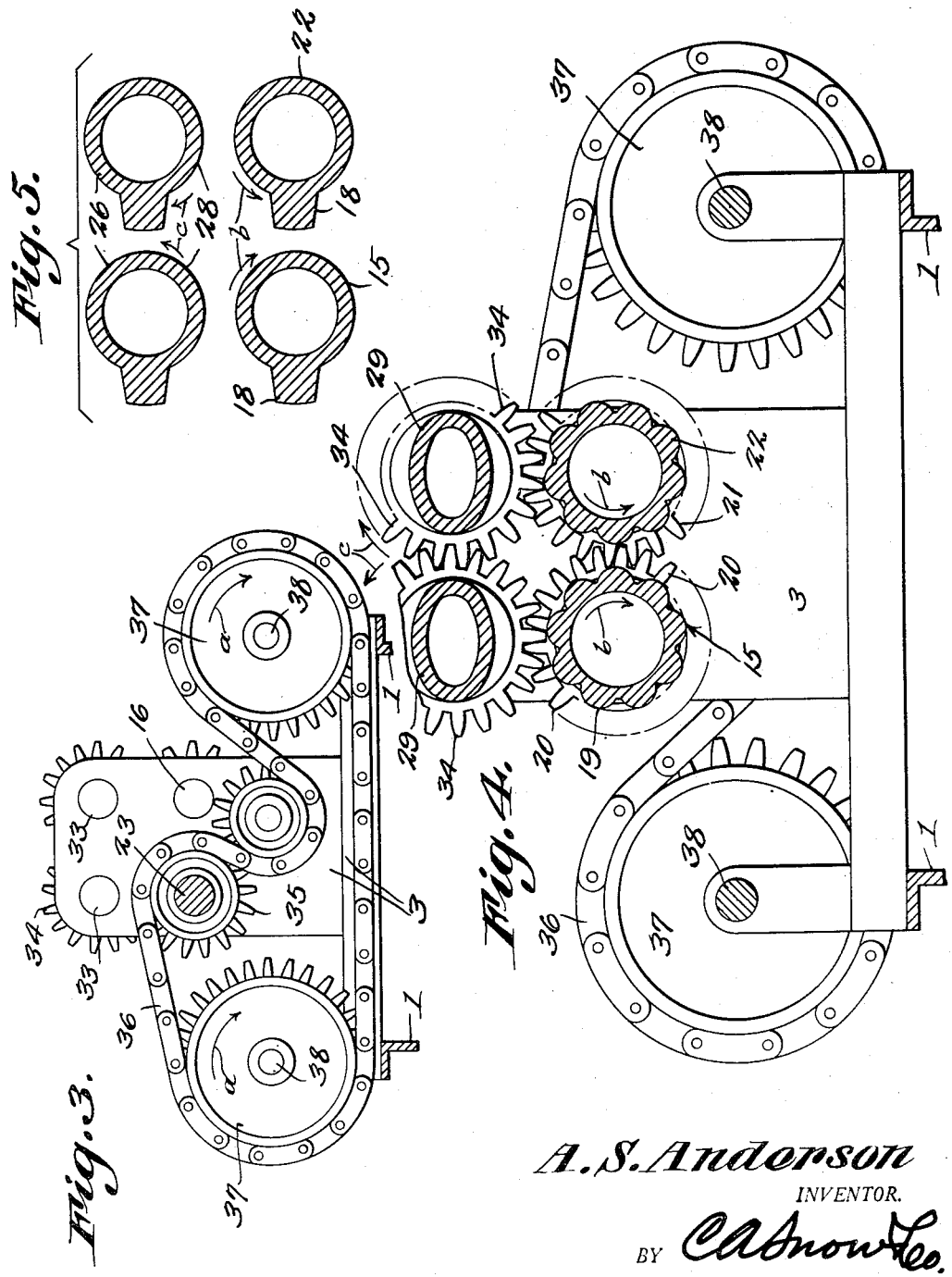
A. S. Anderson
INVENTOR.
BY C. A. Snow & Co.
ATTORNEYS.

Patented Jan. 28, 1941

2,229,628

UNITED STATES PATENT OFFICE 2,229,628

CORN HARVESTER

Arent S. Anderson, Gibson City, Ill.

Application May 8, 1939, Serial No. 272,510

7 Claims. (Cl. 56—104)

This invention relates to machines for harvesting corn and more especially to a snapping unit whereby the ears of corn are removed from the standing stalks.

An object of the invention is to provide a new and novel arrangement of snapping rolls whereby, during the exertion of an upward pull upon the ears for the purpose of removing them from the stalks, said stalks are drawn downwardly away from the rolls.

A further object is to provide snapping rolls so constructed and operated as practically to eliminate the shelling of the butt ends and tips of the ears while the machine is in operation.

A further object is to utilize in the snapping unit superposed pairs of rolls, the upper pair rotating oppositely to the rolls of the lower pair so that while the rolls of the upper pair are picking the ears, the rolls of the lower pair are pulling the stalks downwardly.

A further object is to provide the rolls with pick-up means whereby the stalks and ears are properly positioned relative to the rolls.

A still further object is to provide a snapping unit which is self-cleaning and the rolls of which can be adjusted to act properly upon stalks of any sizes.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 2 is a side elevation thereof, a portion of the superstructure being broken away.

Figure 3 is a section on line 3—3, Figure 1, said section being on an enlarged scale.

Figure 4 is an enlarged section on line 4—4, Figure 1, a portion being broken away.

Figure 5 is a section on an enlarged scale taken on the line 5—5, Figure 1.

Figure 1:
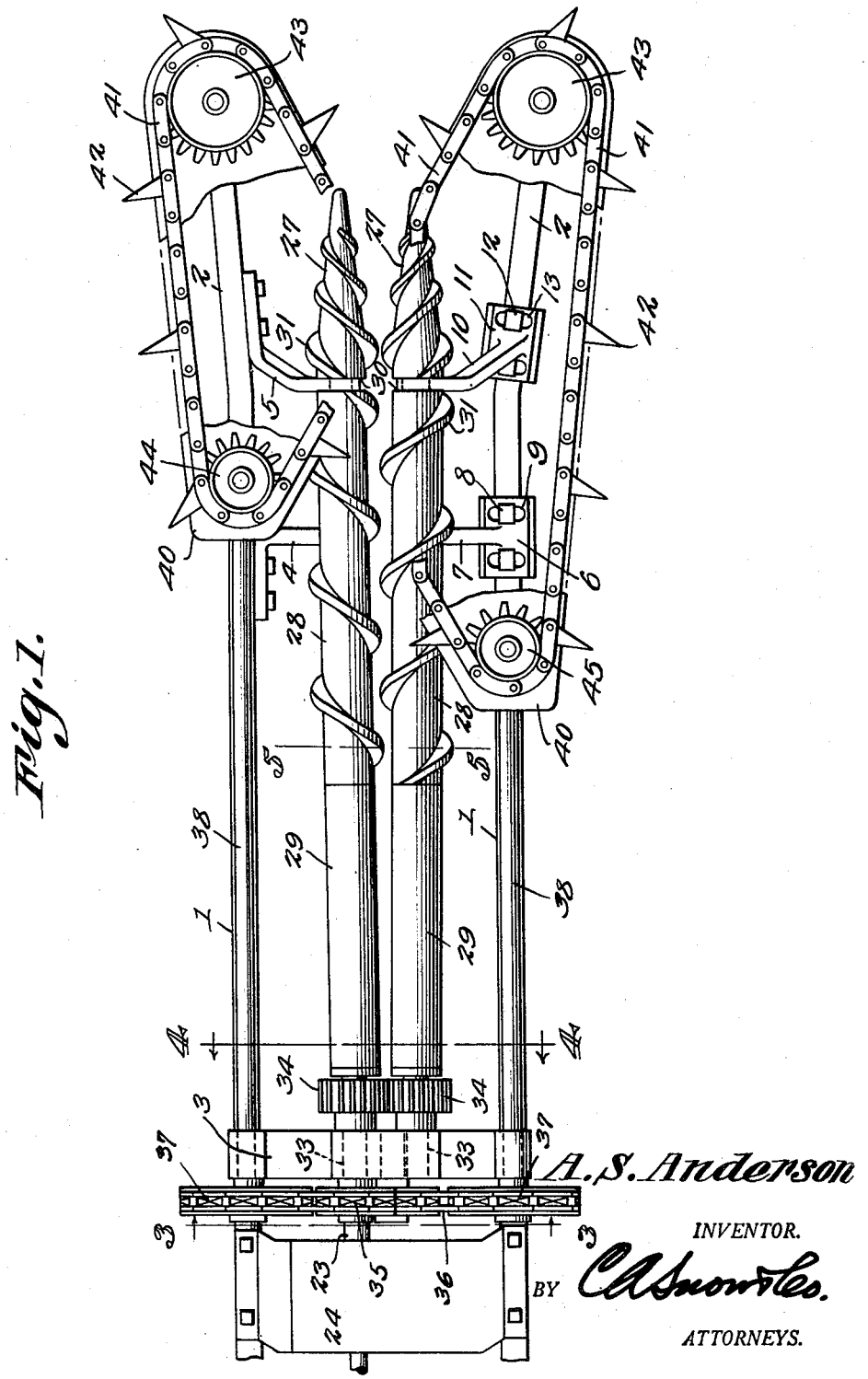
Figure 1 is a top plan view of the unit constituting the present invention.

Referring to the figures by characters of reference, 1 designates downwardly and forwardly inclined beams provided at their front ends, with forward extensions 2, the two beams being spaced laterally while the forward extensions 2 diverge forwardly.

The beams 1 are connected near their upper ends by a transverse head 3 and secured to one of the beams 1 near its lower end is a bracket 4 constituting a bearing. Another bracket, indicated at 5, is extended laterally and upwardly from the extension 2 of said beam and also constitutes a bearing.

To the lower end of the other beam 1 is attached the base 6 of an adjustable bearing bracket 7, this base being held in place by bolts 8 extended through transverse slots 9 and obviously by loosening these bolts the plate can be adjusted laterally relative to beam 1 so as thus to move bearing bracket 7 toward or from the bracket 4. Another bearing bracket 10 is mounted on the extension 2 of the beam to which bracket 7 is attached and this bearing bracket 10 has a base 11 mounted on extension 2 and held thereto adjustably by bolt 12 extending through slot 13. Thus this bracket can be adjusted laterally in the same manner as bracket 7 so as to be moved toward or from the opposed bracket 5. Bracket 10 is extended laterally and upwardly.

Journalled in the upper end of bracket 7 is a neck 14 projecting from the front end of a roll 15, another neck 16 being extended from the other end of the roll and journalled in the head 3. This roll is inclined downwardly and forwardly and the forward end portion thereof is tapered, as indicated at 17 and provided with a helical rib or blade 18 so that said tapered portion 17 will operate to pick up stalks and direct them backwardly and upwardly during the advance movement of the unit. The helical blade or rib 18 terminates at its upper end at the forward end of a corrugated portion 19 of the roll, the corrugations being parallel and extended for the greater portion of the length of the roll. A gear 20 is secured to the upper neck 16 of roll 15 and meshes with a similar gear 21 carried by an opposed roll 22 which is of the same size and shape as roll 15 and bears at its forward end in bracket 4 while the neck 23 at its upper end is extended through the bearing head 3 and into a casing 24 which can contain a suitable speed reduction gear whereby motion may be transmitted from a drive shaft 25 to neck 23 and the two rolls 15 and 22. Because of the interfitting gears 20 and 21 it will be apparent that these two rolls will simultaneously rotate in opposite directions respectively, it being designed to have them rotate in the directions indicated by the arrows b and c in Figure 4.

An upper pick-up roll 26 is located above and parallel with each of the rolls 15 and each of these pick-up rolls has a forward tapered portion 27, an intermediate cylindrical portion 28, and a rear cam portion 29. The roll is reduced annularly between the portions 27 and 28 as shown at 30 so as to be engaged by and bear within bracket 10 or bracket 5. A helical rib or blade 31 is extended along each roll from the forward end thereof to the annularly reduced portion 30 and another helical blade or rib 32 is extended from said reduced portion 30 rearwardly to the end of the cylindrical portion 28. The helical blades or ribs on the portions 27 and 28 of one roll are all pitched in the same direction while the corresponding blades or ribs on the other roll 26 are all pitched in the opposite direction.

The cam portions 29 are elliptical in cross section as indicated particularly in Figure 4 and the long transverse axes of the two elliptical portions 29 are so positioned relative to each other as to move into alinement at the completion of each half rotation of the rolls. These axes have been shown alined in Figure 4.

The necks 33 extending upwardly from the rolls 26 are supported within the bearing heads 3 and each of them is provided with a gear 34. The two gears are in constant mesh so that the rolls 26 will be rotated in opposite directions respectively as indicated by arrows c in Figure 4, it being obvious that, because of the arrangement of the gears 20, 21 and 34, each upper roll 26 will rotate oppositely to the roll thereunder.

In the structure illustrated a sprocket 35 is secured to and rotates with the neck 23 and serves to transmit motion through an endless chain or belt 36 to sprockets 37 secured to side shafts 38. These side shafts are extended downwardly and forwardly about the beams 1 and are mounted in suitable bearings 39 carried by the beams. A superstructure 40 of any suitable construction is secured on the forward portion of each beam 1 and its extension 2 and above the level of the adjacent rolls 26. These superstructures are spaced apart so as not to interfere with the reception of standing stalks between them and each superstructure 40 is mounted at its back end on posts 40'. Each of the superstructures 40 can be provided with any suitable arrangement of gathering chains 41 having laterally extended fingers 42. The chains are engaged and supported at the front end of the machine by suitably arranged guide sprockets 43. It is intended to have these sprockets so located as to cause the chains to draw standing stalks into position between the pick-up portions 27 of the upper rolls 26.

Certain of the sprockets engaged by the chains constitute drive sprockets as shown at 44 and 45 and sprocket 44 is adapted to be driven through its shaft 46 by gears 47 and 47' secured to said shaft and to one of the shafts 38. The other sprocket 45 is driven through its shaft 49 by gears 50 and 50' carried by said shaft and by the other shaft 38. The gears 47' and 50' are oppositely arranged so that when the two shafts 38 are driven in the same direction simultaneously as indicated by arrows a in Figure 3, the shafts 46 and 49 will be driven in opposite directions respectively and the inner sides of the two gathering chains will be moved rearwardly and upwardly.

In practice the snapping unit which has been shown and described is advanced along a row of standing stalks which are engaged by rearwardly moving fingers 42 of chains 41 and gathered between the advancing pick-up portions 27 of the rolls 26. The helical blades or ribs 31 on these pick-up portions operate to move the stalks upwardly and rearwardly and to insure their assuming substantially vertical positions between the advancing rolls of the snapping unit. Subsequently the helical blades or ribs on the pick-up portions 17 of rolls 15 engage the stalks and likewise cooperate to thrust them rearwardly as the machine advances.

Ultimately the stalks are brought into position between the corrugated portions 19 of the lower rolls and the cam portions 29 of the upper rolls. As the stalk-engaging portions of the corrugated rolls are moving downwardly, they operate to pull the stalks downwardly, as shown by arrows b in Figure 4. At the same time the cam rolls 29 move upwardly, as shown by arrows c in said figure, to thrust upwardly against the butt of the ears so as to pick them off of the descending stalks. In view of the fact that the cam rolls have smooth surfaces with no parts thereon for biting into the ears, it has been found in practice that by utilizing these cam rolls for picking the ears from the stalks being pulled downwardly, the ears can be snapped from the stalks with practically no shelling of the butt ends or the tips of the ears. As the stalks are being constantly pulled downwardly, they will ultimately be withdrawn from the apparatus and the ears snapped therefrom can be disposed of in any manner found most suitable. Obviously the machine is self-clearing so that it will not become choked by stalks.

By mounting the rolls at one side of the apparatus so that they can be adjusted laterally with bearings 7 and 10, the apparatus can be adapted to stalks of different thicknesses. It is of course intended that the maximum distance between its cam portions 29 during the operation thereof will at no time be greater than the diameter of the ears being operated on. It is also to be understood that the upper or snapping rolls 26 as well as the lower or pulling rolls 15 can be made of any size necessary to meet the working requirements and can also be made of any suitable material.

What is claimed is:

1. A snapping unit for corn harvesters including a pair of oppositely rotatable stalk pulling rolls, means for rotating said rolls simultaneously in opposite directions respectively, a pair of snapping rolls thereabove, means for rotating said snapping rolls simultaneously in opposite directions respectively and oppositely to the pulling rolls therebeneath, and means for guiding standing stalks into position between the rolls of each pair.

2. A snapping unit for corn harvesters including a pair of stalk pulling rolls, a pair of snapping rolls thereabove, means for simultaneously rotating these pulling rolls to pull downwardly upon stalks therebetween and for simultaneously rotating the snapping rolls to pull upwardly upon ears on the engaged stalks.

3. A snapping unit for corn harvesters including a pair of stalk pulling rolls, a pair of snapping rolls thereabove, means for simultaneously rotating these pulling rolls to pull downwardly upon stalks therebetween and for simultaneously rotating the snapping rolls to pull upwardly upon ears on the engaged stalks, and means for guiding stalks into position between the rolls of the two pairs.

4. A snapping unit for corn harvesters including a pair of corrugated stalk pulling rolls, a pair of snapping rolls thereabove each including a longitudinally extending cam portion, and means for simultaneously rotating all of the rolls, the rolls of each pair being rotatable in opposite directions respectively and the rolls of one pair being rotated oppositely to the corresponding rolls of the other pair.

5. A snapping unit for corn harvesters including a pair of stalk pulling rolls having a stalk receiving space therebetween, each of said rolls including a tapered forward portion, an outstanding helical portion on the tapered portion, and a longitudinally corrugated portion, means for rotating said rolls simultaneously in opposite directions respectively to draw stalks between the corrugated portions and to pull downwardly on the engaged stalks, and means above the rolls for engaging and removing ears from the stalks being drawn.

6. A snapping unit for corn harvesters including a pair of stalk pulling rolls having a stalk receiving space therebetween, each of said rolls including a tapered forward portion, an outstanding helical portion on the tapered portion, and a longitudinally corrugated portion, means for rotating said rolls simultaneously in opposite directions respectively to draw stalks between the corrugated portions and to pull downwardly on the engaged stalks, and means above the rolls for engaging and removing ears from the stalks being drawn, said means including a pair of rolls having a stalk receiving space between them, each roll having a tapered pick-up portion at its front end, a helical portion on the pick-up portion and a longitudinal cam extending from the helical portion, and means for rotating said rolls simultaneously in opposite directions to direct engaged stalks into the space between the cam portions and to move said cam portions to pull upwardly upon the ears on the stalks therebetween.

7. A snapping unit for corn harvesters including superposed stalk-engaging elements, and means for simultaneously operating said elements to simultaneously pull stalks and the ears thereon in opposite directions respectively.

ARENT S. ANDERSON.